United States Patent
Venugopal et al.

(10) Patent No.: US 11,425,024 B2
(45) Date of Patent: Aug. 23, 2022

(54) THREAD NETWORK ROUTING CONTROL

(71) Applicant: Arm Limited, Cambridge (GB)

(72) Inventors: Deepak Venugopal, Oulu (FI); Arto Juhani Kinnunen, Oulu (FI); Mika Antero Tervonen, Oulu (FI)

(73) Assignee: Arm Limited, Cambridge (GB)

( * ) Notice: Subject to any disclaimer, the term of this patent is extended or adjusted under 35 U.S.C. 154(b) by 164 days.

(21) Appl. No.: 16/269,211

(22) Filed: Feb. 6, 2019

(65) Prior Publication Data

US 2020/0252326 A1 Aug. 6, 2020

(51) Int. Cl.
*H04L 45/00* (2022.01)
*H04L 45/02* (2022.01)
*H04L 45/121* (2022.01)
*H04W 84/18* (2009.01)

(52) U.S. Cl.
CPC ............ *H04L 45/10* (2013.01); *H04L 45/026* (2013.01); *H04L 45/121* (2013.01); *H04W 84/18* (2013.01)

(58) Field of Classification Search
CPC ............................ H04L 12/2807; H04L 45/28
See application file for complete search history.

(56) References Cited

U.S. PATENT DOCUMENTS

| | | | |
|---|---|---|---|
| 2003/0179742 A1* | 9/2003 | Ogier | H04L 61/251 370/389 |
| 2004/0228490 A1* | 11/2004 | Klemba | H04W 52/46 380/270 |
| 2005/0265259 A1* | 12/2005 | Thubert | H04L 45/46 370/408 |
| 2011/0176420 A1* | 7/2011 | Shiotsuki | H04L 69/161 370/235 |
| 2017/0222877 A1* | 8/2017 | Sagot | H04W 40/24 |
| 2018/0139728 A1* | 5/2018 | Kozura | G06F 9/5011 |
| 2018/0184360 A1* | 6/2018 | Cavalcanti | H04W 52/0261 |
| 2019/0014043 A1* | 1/2019 | Hui | H04L 47/29 |
| 2019/0363865 A1* | 11/2019 | Dong | H04L 5/0055 |
| 2020/0252325 A1 | 8/2020 | Venugopal et al. | |

* cited by examiner

*Primary Examiner* — Nicholas R Taylor
*Assistant Examiner* — Sm Z Islam
(74) *Attorney, Agent, or Firm* — Patterson Thuente Pedersen, P.A.

(57) ABSTRACT

Provided is a machine-implemented method for operating a device in a network, comprising entering the device into a non-router membership relation with a self-organizing subnet of the network; receiving at least one message making known parameters of the subnet, the at least one message comprising a centrally-generated and propagated sequence number; detecting, based on the received at least one message comprising a sequence number, a deterioration in propagation of said at least one message; and responsive to the detecting, entering the device into a router membership relation with the self-organizing subnet of the network.

20 Claims, 8 Drawing Sheets

THREAD NETWORK ROUTING CONTROL

The present technology is directed to the control of routing between devices that are operable in electronic communication with further devices within self-assembling network and subnet environments, such as Thread network partitions, and more particularly to the control of routing in networks in which connectivity is threatened or fragile.

Implementations of the present technology are operable in many network environments that support mesh (any-to-any connectivity) operations, exemplified by, but not limited to, Thread networks. Thread networks are dynamically created mesh networks that rely on intelligence programmed into individual devices to build working connectivity over wider ranges than would be available, for example, using the wireless connectivity of an individual device. A perennial difficulty in many networks, especially those that rely on wireless connectivity, is that of loss of connectivity—wireless signals may, for example, suffer from physical interruptions and interference from other signals and noise on the transmission channels.

Thread network devices comprise routers and end devices, connected in such a manner as to enable multi-hop communications as an approach to overcoming connectivity limitations, such as wireless network range limitations. Thread network end devices typically incorporate processing capabilities that are operable to perform normal data processing workloads, and some of these end devices are also capable of becoming routers—these are known as Router-Eligible End Devices (REEDs). Some routers may be operable as Border Routers, which allow the Thread networks to establish external connections to the Internet. The promotions and demotions between REED and router status are controlled according to rules established by the Thread specification.

Devices in Thread networks are operable to build partitions—that is, dynamically self-assembling subnets that coalesce round a leader. A leader generates numerical partition information comprising a partition ID and a partition weighting—this numerical partition information determines a hierarchical ranking of each partition relative to other partitions, and is propagated across the network in the parameters of an advertisement message. Devices operable in Thread environments are pre-programmed to follow certain rules in joining partitions, in becoming routers if they are eligible and in becoming leaders; after joining a partition, further rules are acted upon such that a device repeatedly attempts (until successful) to merge to a detected partition of a higher rank when it detects an advertisement message containing partition information parameters as described above from the higher-ranking partition. Each leader periodically transmits advertisement messages as multicast transmissions to attract partitions of lower rank. Thus, a higher-ranking Thread network partition is designed to attract lower-ranked partitions to itself (by advertising itself) until all devices have merged into the highest-ranking partition.

The dynamic process of expansion of the network may take a significant time to extend connectivity across a collection of devices, and it is vulnerable to interruption and restart during that time. The time it takes to develop a Thread network in this "organic growth" model, and the vulnerability of the network to breakage and reestablishment, are among the difficulties faced in adoption of the Thread network approach.

As will be clear to one of ordinary skill in the art, it is also necessary to set the periodicity of advertisement messages to a reasonable limit, so that bandwidth available for the normal workload-related transmissions in the network is subject to as little interference as possible from the advertisement messages. Thus, the need to send the advertisement messages to increase the connectivity of the network is traded off against the need to preserve bandwidth for "real work" to be done by the network.

Thus, any loss of connectivity has an associated cost in dropped messages causing retries and delays, in addition to lost processor working time available for useful work as the advertisement and connection process takes place.

The further operation of Thread networks according to the published Thread specification is sufficiently well known to those of ordinary skill in the computing art to need no further detailed description, except insofar as is necessary to illustrate the details of the presently-disclosed technology.

In a first approach to the many difficulties encountered in managing connectivity in networks, the presently-disclosed technology provides a machine-implemented method for operating a device in a network, comprising entering the device into a non-router membership relation with a self-organizing subnet of the network; receiving at least one message making known parameters of the subnet, the at least one message comprising a centrally-generated and propagated sequence number; detecting, based on the received at least one message comprising a sequence number, a deterioration in propagation of said at least one message; and responsive to the detecting, entering the device into a router membership relation with the self-organizing subnet of the network.

In a hardware approach, there is provided electronic apparatus comprising logic elements operable to implement the methods of the present technology. In another approach, the computer-implemented method may be realised in the form of a computer program product, tangibly stored in a non-transient storage medium, and operable in use to cause a computer system to perform the process of the present technology.

In this way, the present technology provides a machine-implemented method of operating a device, an apparatus and a computer program product to control routing between devices that are operable in electronic communication with further devices within self-assembling network and subnet environments, such as Thread network partitions, and more particularly to the control of routing in networks in which connectivity is threatened or fragile.

Implementations of the disclosed technology will now be described, by way of example only, with reference to the accompanying drawings, in which.

A Thread network partition is a connected group of nodes that operate independently of any other nodes in the network, and is formed at the instigation of a leader chosen according to a randomly-issued partition identifier. A partition has a position in a hierarchy of partitions, based on a ranking schema. If multiple partitions are formed, all devices will eventually join the highest-ranked partition. When a new device joins the network, it becomes a REED in that network. If the Thread algorithm determines that the network needs more routers, REEDs will become routers to improve the routing connectivity of the network.

Devices in Thread networks are operable to build and maintain partitions—that is, dynamically self-assembling subnets that coalesce round a leader. Devices operable in Thread environments are pre-programmed to follow certain rules in joining partitions, in becoming routers if they are eligible and in becoming leaders. The maintenance of connectivity in a partition relies on a periodical generation and propagation of sequence numbers generated by a leader as a series increasing in value over time. The leader transmits periodical advertisement messages containing, among their parameters, up-to-date sequence numbers. The messages containing the sequence numbers are received by routers, and each router then issues an advertisement message containing the highest sequence number it has heard. The sequence numbers are also heard by REEDs, but REED advertisement messages do not include sequence numbers.

Routers in a partition thus expect to receive new sequence numbers periodically, and consider themselves disconnected if they do not receive a new sequence number before expiry of a given period. In one exemplary implementation, a leader generates and sends a new, higher sequence number every 10 seconds, and a router considers itself disconnected from the leader if it has not received a new sequence number within 120 seconds from the last. When routers lose their connection to a leader, connectivity over the partition is lost and the partition may become fragmented. In a typical scenario, disruption to the network may take several "rounds" of advertisement message traffic and cost more than 600 seconds before it can be remedied. It is clearly undesirable to have networks disrupted and thus unable to perform useful work for such a period.

Figure 1:
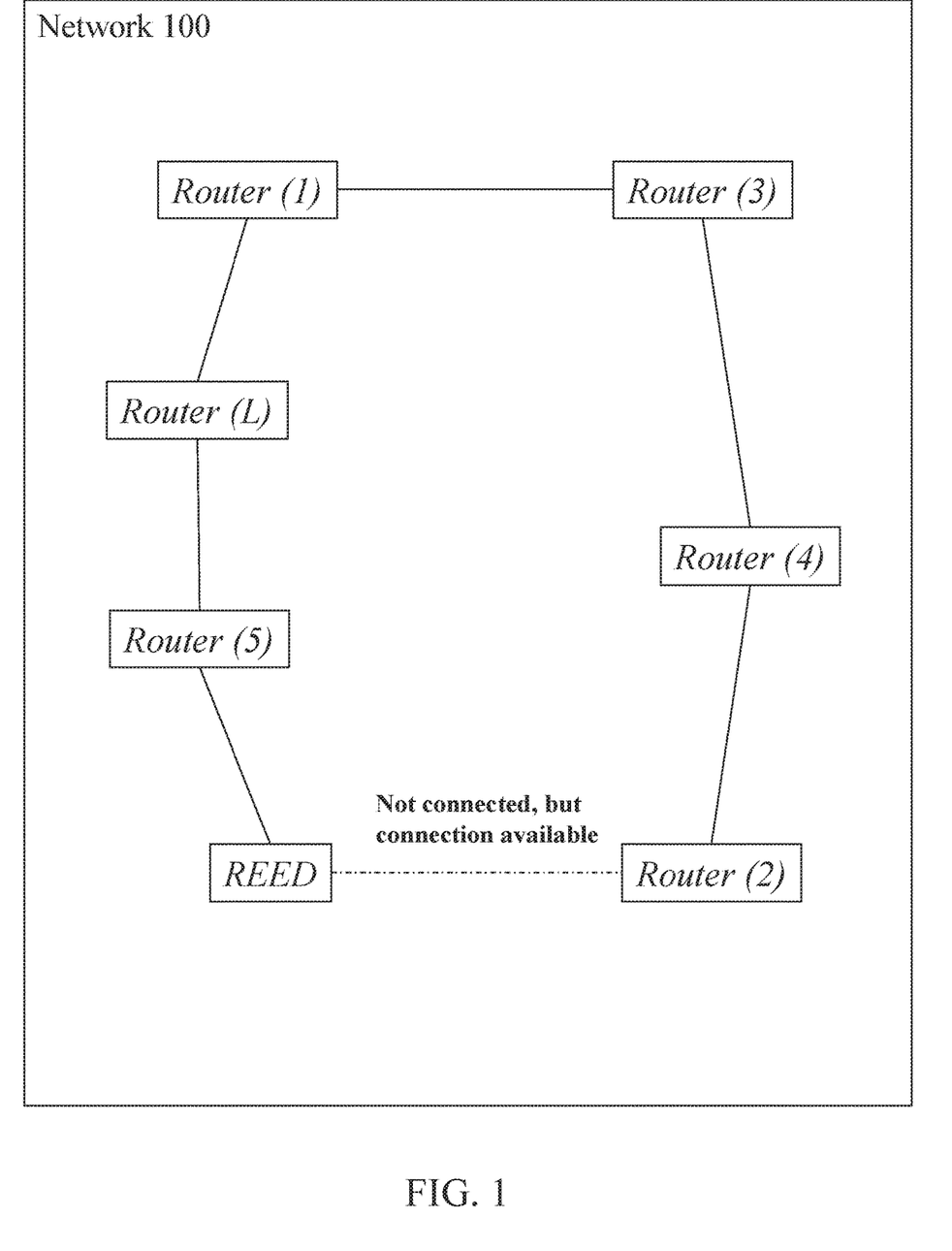
FIG. 1 shows an exemplary network in which the present technology may be operable.

FIG. 1 shows a network 100 in which the present technology may be operable. In FIG. 1, Router (L) is the partition leader and connects to two "legs" terminating respectively at REED and at Router 2. The first leg comprises Router (L), Router (5) and REED; the second leg comprises Router (L), Router (1), Router (3), Router (4) and Router (2). There is an available connection between REED and Router (2), and REED can hear advertisement messages with sequence numbers propagated by Router (2), but REED and Router (2) are not presently connected as a routing path. The partition having Router (L) as leader is shown as functioning normally, and thus each router and REED receives a sequence number by propagation of advertisement messages from Router (L). Each router receiving an advertisement message containing a sequence number propagates the sequence number onward through the partition in its own advertisement message. REED receives the advertisement messages containing sequence numbers, but does not include sequence numbers in its own advertisement messages.

Figure 2:
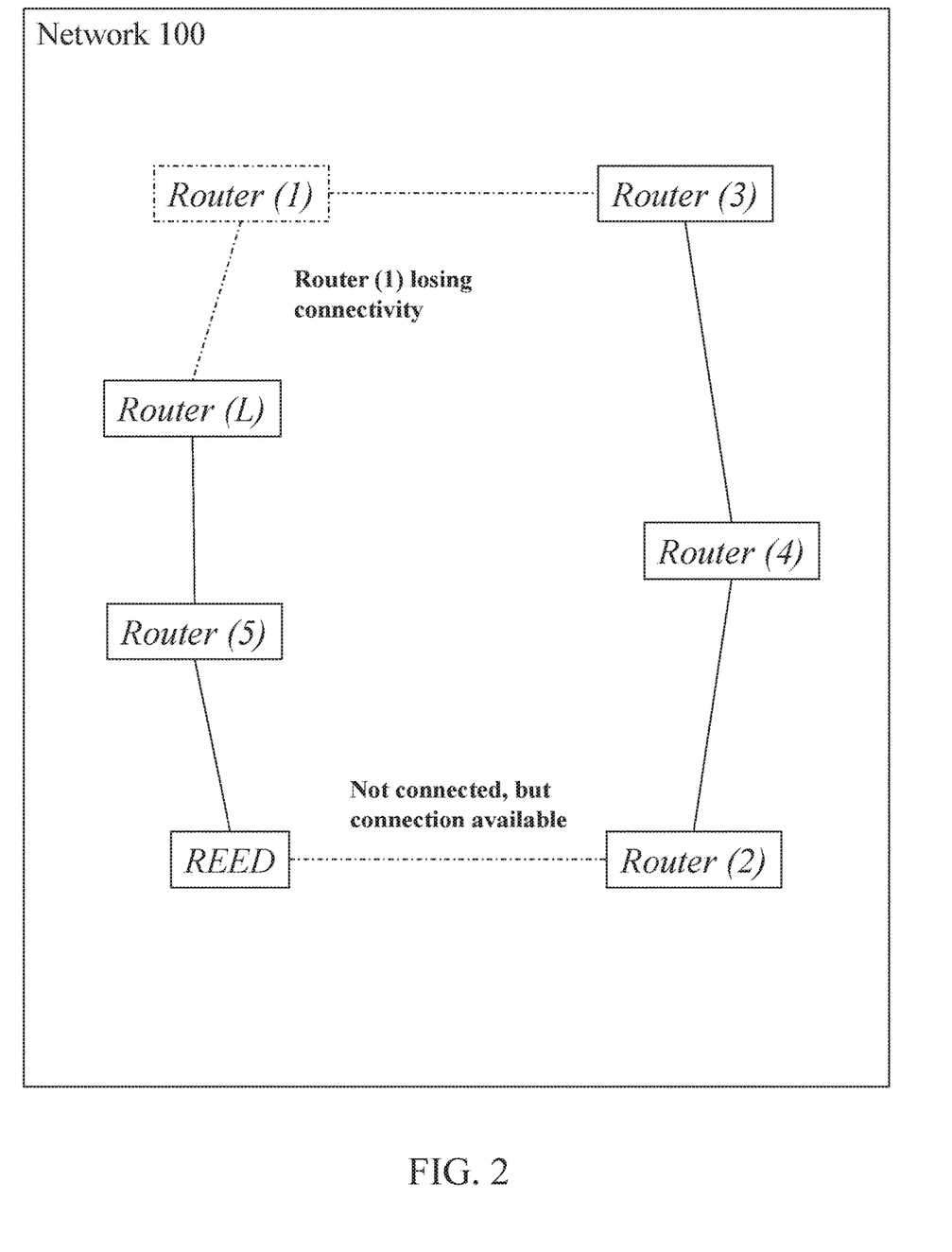
FIG. 2 shows a network response according to the conventional technology.

FIG. 2 shows a network response in network 100 according the conventional technology. In FIG. 2, Router (1) is losing connectivity to Router (L) and eventually detaches from the network when the connection to Router (L) is lost, also losing its connection to Router (3). The decline in connectivity that ends in full disconnection is gradual. When the connection has deteriorated to the point where connectivity is lost, the network becomes fragmented, isolating the "leg" comprising Router (3), Router (4) and Router (2) from the leg comprising Router (L), Router (5) and REED.

Any deterioration in propagation of the sequence numbers in the parameters of the advertisement messages is a good indicator that connectivity in the network is similarly deteriorating, with the resulting potential for fragmentation. Fragmented networks are clearly undesirable, as the optimal condition of a mesh network is any-to-any connectivity with the overall aim of maximising the real work productivity of the network. The reestablishment of connectivity bears a cost in lost work opportunity, processor capacity consumption and bandwidth occupation over time, and it is thus preferable to avoid this cost.

Figure 3:
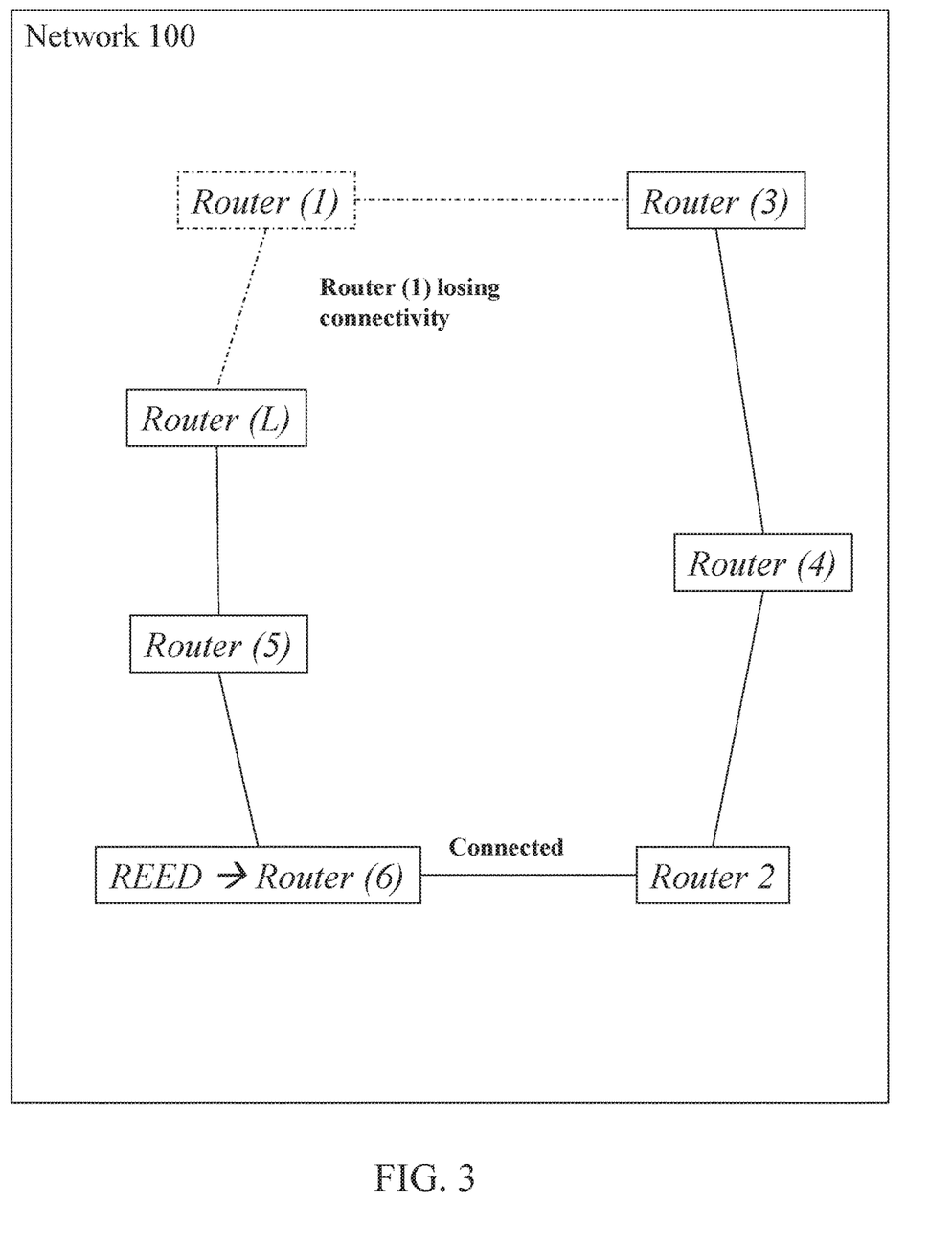
FIG. 3 shows a network response according to an implementation of the present technology.

FIG. 3 shows a network response in network 100 according to an implementation of the present technology. In FIG. 3, Router (1) is losing connectivity to Router (L). REED detects a deterioration in the propagated sequence numbers and has itself promoted to a router as Router (6), thereby enabling itself to make the connection to Router (2) before Router (1) loses connectivity. As a result, the network is now configured as a single leg comprising Router (L), Router (5), Router (6), Router (2), Router (4) and Router (3). Connectivity is maintained for all remaining members after the loss of Router (1).

The REED of FIG. 3 is provided with additional functionality according to the present technology to analyse the sequence numbers it receives in advertisement messages, to detect deterioration in the propagation of sequence numbers, and to respond to such deterioration by invoking the REED-to-router promotion rules to have itself promoted to router status, hereby preventing fragmentation of the subnet, for example the Thread network partition, to which it belongs. In an implementation, the REED does this by requesting a router ID from the partition leader. Once granted a router ID, the REED begins to act as a router by sending advertisement messages containing the latest sequence number acquired from the leader, and so indicating to receivers that the leader is still operational in the partition.

In implementations of the present technology, the REED is provided with functionality to monitor the in-range advertisement messages that are multicast by the routers in its partition, including the partition leader. The partition leader sends its current sequence number, while the other routers propagate the sequence numbers they have received. If the REED detects that some of the routers are propagating older sequence numbers than other routers, or if it detects delays in propagation, it can deduce that there is a possible loss of connectivity in the partition.

For example, as shown in FIG. 2, as Router (1) loses connectivity, the sequence numbers propagated down the Router (3)→Router (4)→Router (2) leg of the network cease being refreshed, as that leg is cut off from Router (L), the partition leader. REED is thus detecting sequence numbers refreshed by Router (L) in the advertisement messages it receives from Router (5) along with older sequence numbers in the advertisement messages it is receiving from Router (2). This discrepancy alerts REED to the "upstream" loss of connectivity, and it responds by requesting an upgrade to router status REED Router (6). The promotion of the REED in response to the deterioration in sequence number quality in the Router (3) Router (4) Router (2) leg of the network restores connectivity without the network passing through a period of fragmentation and reestablishment.

The Thread specification (as well as practical considerations in any similar network) places a limit on the number of devices that can act as routers. If the promotion of REED Router (6) would push the router count for the network or partition over this limit, the network is scanned and the router whose absence would have the least effect on the network is selected for demotion to REED status.

Figure 4:
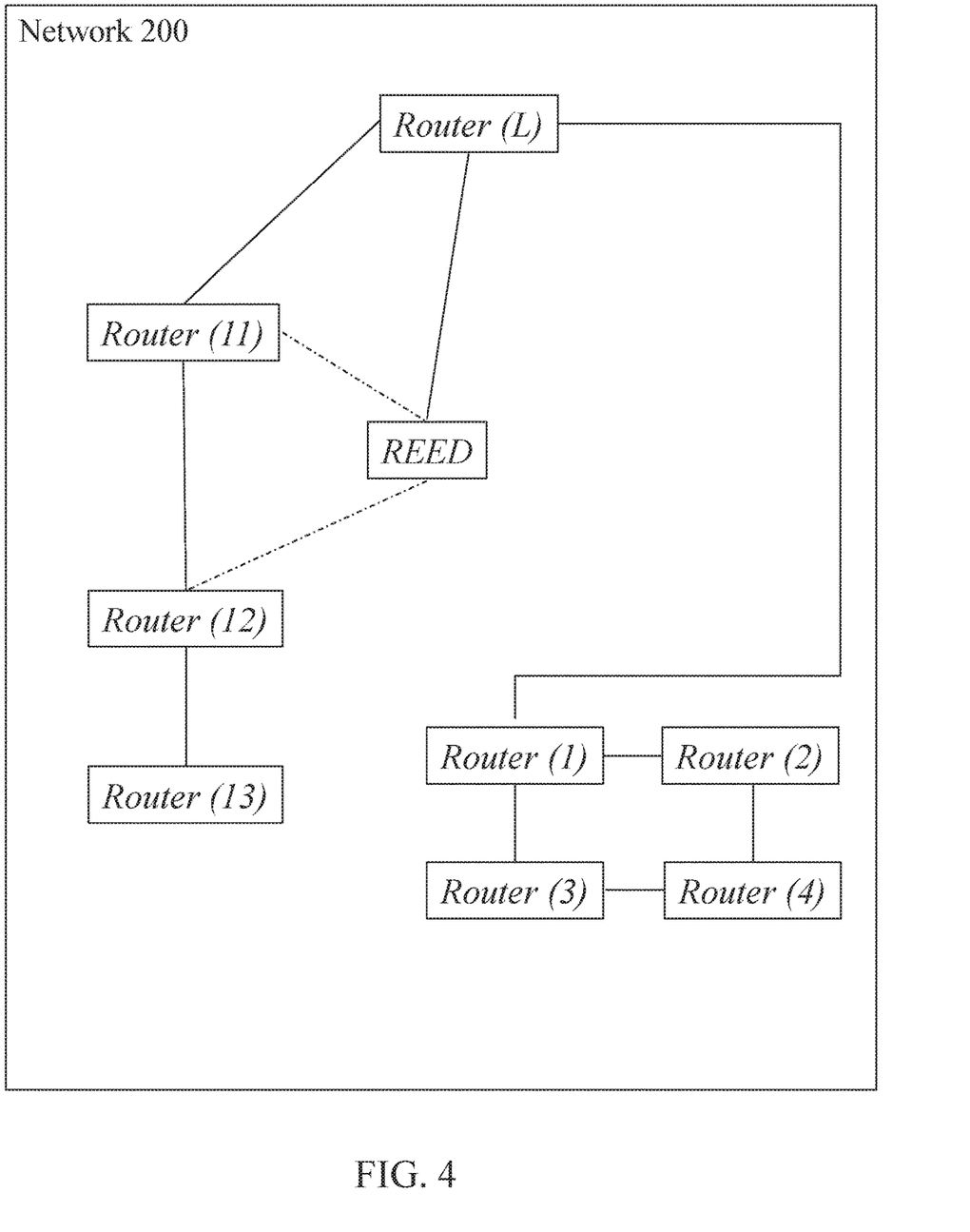
FIG. 4 shows a second exemplary network in which the present technology may be operable.

Turning to consider FIG. 4, there is shown a second exemplary network 200 in which the present technology may be operable. In network 200, Router (L) is connected to the fully interconnected mesh of Router (1), Router (2), Router (3) and Router (4), and to Router (11), Router (12) and Router (13). Router (L) has a direct connection to REED, which can also receive advertisement messages from Router (11) and Router (12), although it does not have a routing connection to them.

Figure 5:
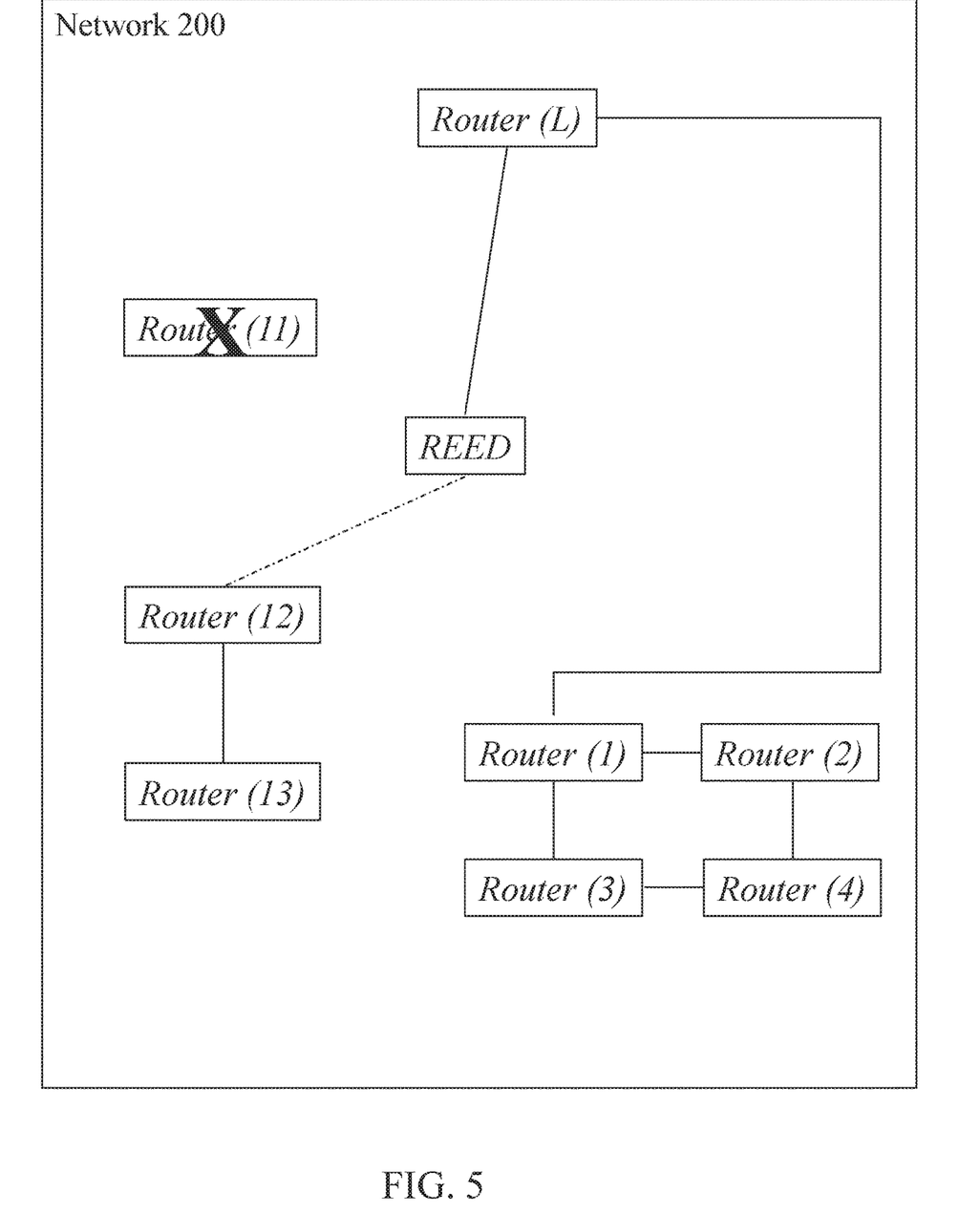
FIG. 5 shows a network response according to the conventional technology.

FIG. 5 shows a network response to a connectivity problem in network 200 according to the conventional technology. In FIG. 5, Router (11) has lost connectivity to Router (L), the partition leader. As a result, there is no longer a path from Router (L) to enable propagation of up-to-date sequence numbers to Router (12) and Router (13). Router (12) and Router (13) are now detached from communication with Router (L) and its partition, but continue to send advertisement messages containing the last sequence number each received. REED receives the advertisement messages from Router (12) containing the last sequence number received by Router (12), and is also continuing to receive advertisement messages from Router (L) containing the up-to-date sequence numbers. As time passes, the discrepancy between the sequence numbers REED is receiving from Router (L) and Router (12) increases.

Figure 6:
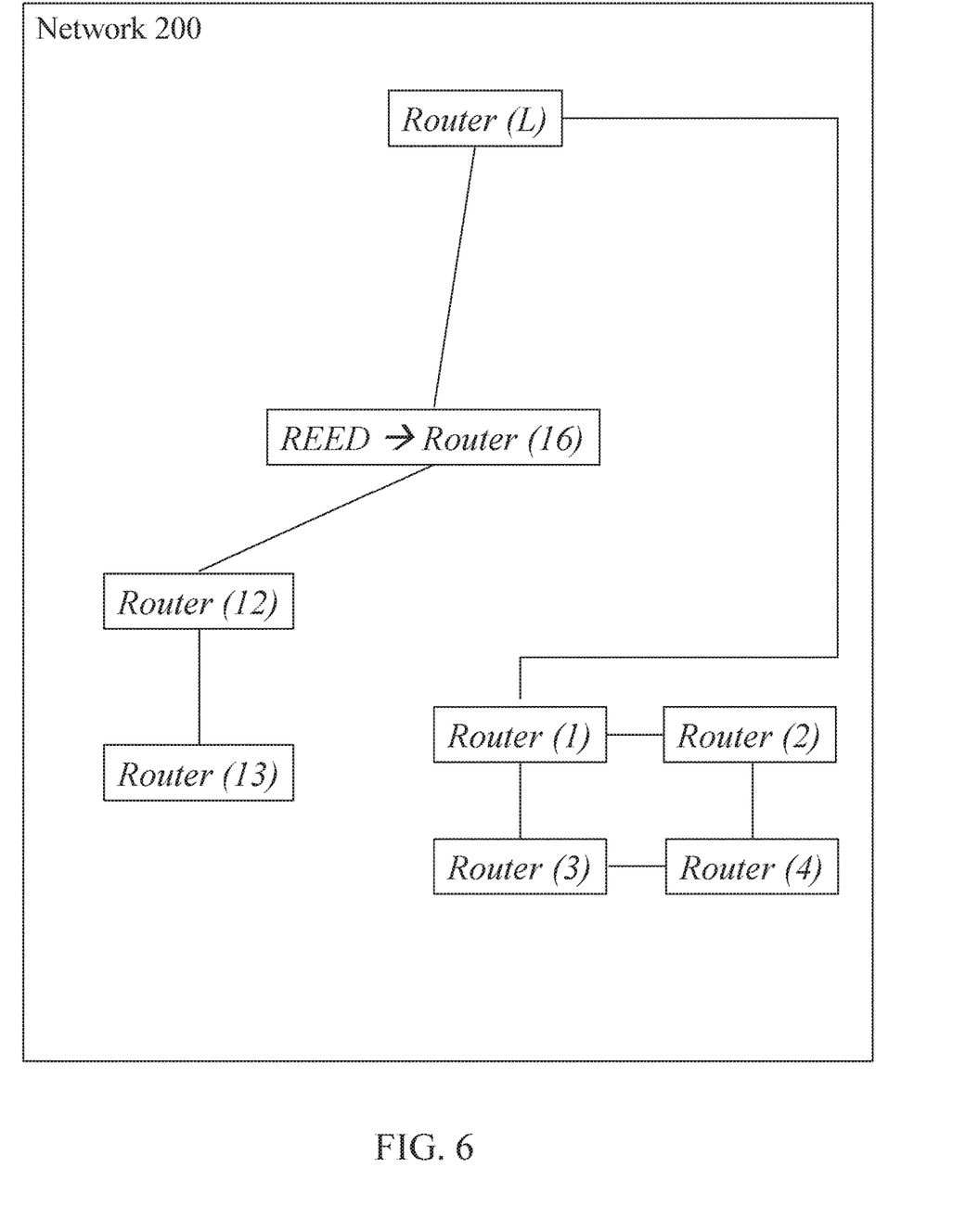
FIG. 6 shows a network response according to an implementation of the present technology.

FIG. 6 shows a network response in network 200 according to an implementation of the present technology. In FIG. 6, REED has received the advertisement messages from Router (12) containing the last sequence number received by Router (12), and has also continued to receive advertisement messages from Router (L) containing the up-to-date sequence numbers. REED is provided with functionality to monitor and analyse the discrepancy between the sequence numbers REED received from Router (L) and those received from Router (12). Detection of the discrepancy alerts REED to the "upstream" loss of connectivity, and it responds by requesting an upgrade to router status: REED Router (16). The promotion of REED to Router (16) in response to the deterioration in sequence number quality in the network enables Router (16) to restore connectivity to Router (12) and onward to Router (13), without the network passing through a period of fragmentation and reestablishment.

The Thread specification (as well as practical considerations in any similar network) places a limitation on the number of devices that can act as routers. If the promotion of REED→Router (16) would push the router count for the network or partition over this limit, the network is scanned and the router whose absence would have the least effect on the network is selected for demotion to REED status.

Figure 7:
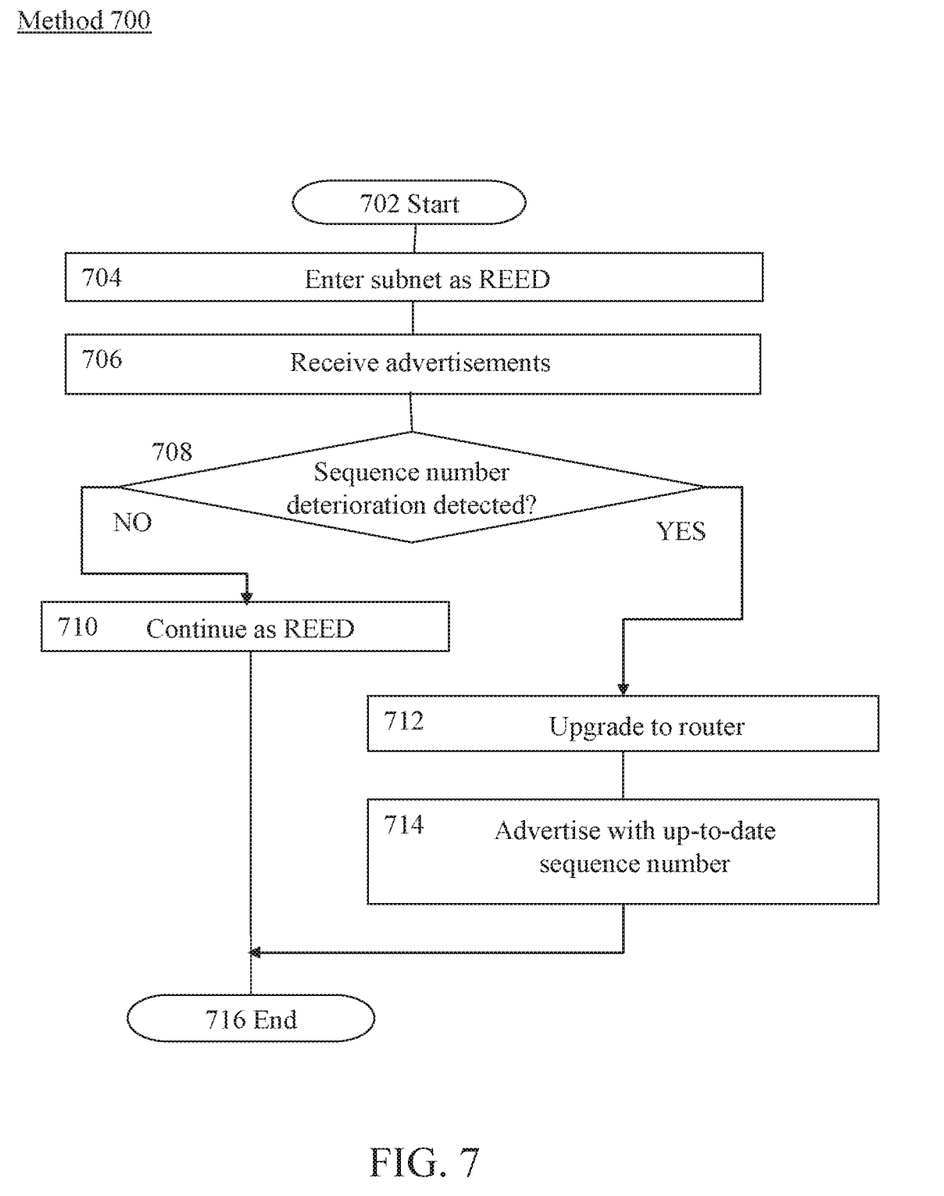
FIG. 7 shows a method of operation of an electronic apparatus to maintain connectivity in a network according to an implementation of the present technology.

Turning now to FIG. 7, there is shown a method of operation of an electronic apparatus to control routing between devices that are operable in electronic communication with further devices within self-assembling network and subnet environments, such as Thread network partitions, and more particularly to the control of routing in networks in which connectivity is threatened or fragile. The method commences at Start 702, and at 704, a device enters the subnet (in this instance, a Thread partition) as a REED.

The device is thus able to receive advertisement messages containing sequence numbers from all routers that are within range of it, but is itself not able to send advertisement messages containing sequence numbers. The REED is also able to request upgrade to router status by requesting a Router ID from the leader of the partition to which it is attached; after the upgrade to router status, it can participate by sending out advertisement messages containing sequence numbers, as described in the Thread specification.

Returning to FIG. 7, REED receives at 706 advertisement messages from devices attached to the network within its range. REED is provided with components that enable it to store and analyse sequence numbers derived from the received advertisement messages, and to operate comparators to detect deterioration in the sequence numbers—for example, by comparing sequence numbers that have been propagated by routers with sequence numbers received from other routers or directly from the leader of the partition and thereby determining that the propagated sequence numbers are not keeping up to date with the sequence numbers more recently generated by the leader and propagated by other routers.

Thus, at test 708, the method comprises determining whether there has been any deterioration in the propagation of sequence numbers. This may be achieved in several ways: for example, by detecting that a sequence number received from a router in a newer advertisement message is the same as that received in an older message, by detecting that a sequence number has been received after an unexpected delay, or by detecting that a sequence number received from one router in the partition is significantly older than one received from a different router. If no deterioration is detected at 708, it may be inferred that network connectivity is not affected, and so the device continues to function as a REED, and the process completes at End 716. As will be clear to one of skill in the computing art, completion at 716 may further represent merely the completion of a single iteration of a repeating process, and thus the method may begin again at Start 702.

If, at test 708, a deterioration in the propagation of sequence numbers is detected, REED requests an upgrade to router status. If the request is granted, REED becomes a router at 712, and is thus able to begin sending advertisement messages containing up-to-date sequence numbers at 714. Connectivity is thus maintained across the network, and the process completes at End 716. As will be clear to one of skill in the computing art, completion at 716 may further represent merely the completion of a single iteration of a repeating process, and thus the method may begin again at Start 702.

Figure 8:
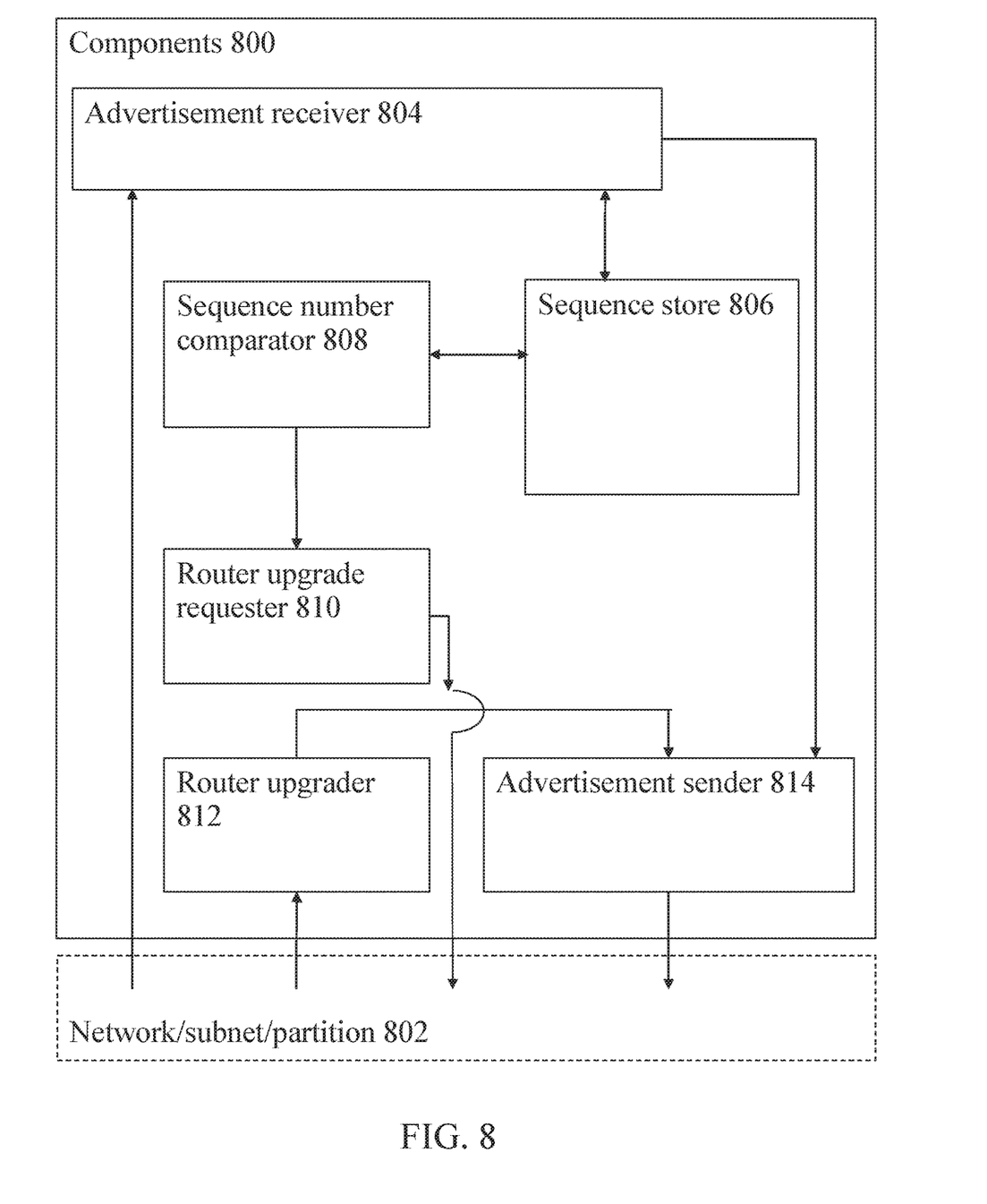
FIG. 8 shows a block diagram of an arrangement of logic, firmware or software components, or any combination thereof, by means of which the presently described technology may be implemented.

Turning now to FIG. 8, there is shown an implementation in which an arrangement of logic, firmware or software components, or any combination thereof, may embody the presently described technology. In FIG. 8, device components 800 are shown, in electronic communication with network (which may comprise a subnet or Thread partition) 802. Device components 800 form part of a device that is operable on first connecting to network 802 as a REED.

Advertisement receiver 804 is operable to receive advertisement messages from other devices in network 802, and to extract and store at least one sequence number from a message at least temporarily in sequence store 806. The use of sequence store 806 allows retention of one or more sequence numbers for analysis and comparison. While device components 800 form part of a REED, advertisement sender 814 is operable to transmit advertisement messages across network 802, but is not operable to include sequence numbers in those advertisement messages, as is specified in the Thread specification.

Sequence number comparator 808 is in electronic communication with sequence store 806 to retrieve at least a pair of sequence numbers that have been received over network 802 and to compare them to determine by inference the state of propagation of the sequence numbers over network 802. If sequence number comparator 808 determines that there is evidence of deterioration in the sequence numbers—for example, if sequence numbers extracted from advertisement messages received from one router in network 802 are being updated, while sequence numbers extracted from advertisement messages received from another router in network 802 are not being updated, sequence number comparator uses its electronic connection with router upgrade requester 810 to transmit a request over network 802 to the leader of the partition of which the REED is a member to upgrade to router status.

In a further embodiment, if sequence number comparator 808 determines that advertisement messages received from one router in network 802 remain static over time, as detected by comparing at least one sequence number received from that router in an older advertisement message with at least one sequence number received from that router in a newer advertisement message, sequence number comparator uses its electronic connection with router upgrade requester 810 to transmit a request over network 802 to the leader of the partition of which the REED is a member to upgrade to router status.

In a yet further embodiment, if sequence number comparator 808 determines that advertisement messages received from one router in network 802 are received with a greater than expected delay, sequence number comparator uses its electronic connection with router upgrade requester 810 to transmit a request over network 802 to the leader of the partition of which the REED is a member to upgrade to router status.

Components 800 further comprise a router upgrader operable to receive an upgrade instruction from network 802 and responsive to the grant of the upgrade to router status to instruct advertisement sender 814 to start acting as a router advertisement sender, rather than as a REED advertisement sender. That is, it becomes operable to include received sequence numbers in its advertisement messages for onward propagation across network 802. Advertisement sender 814 is thus subsequently operable to acquire sequence numbers from advertisement receiver 804 for propagation onward across network 802.

In this way, the presently-disclosed technology provides a machine-implemented method for operating a device in a network, in particular, a mesh network arranged according to the Thread specification. The device is initially in a non-router membership relation with a self-organizing subnet of the network (a Thread partition) as a REED. The REED receives advertisement messages structured according to the Thread specification that make known parameters of the partition, including a centrally-generated and propagated sequence number that is generated by the partition leader and propagated onward by the partition's routers in their own advertisement messages.

The method according to the present technology provides a REED with the capability of detecting when at least one of the sequence numbers indicates a deterioration in propagation of the at least one message, and responsive to the detecting, initiating the process whereby the device enters into a router membership relation with the self-organizing subnet of the network, so that the newly-upgraded router can begin to propagate sequence numbers across the network and thus provide a new routing pathway to restore connectivity.

Detecting when at least one of the sequence numbers indicates a deterioration in propagation of at least one message may, for example, comprise detecting a sequence number propagated by a router remaining static over time, it may comprise detecting that a sequence number propagated by a router diverges from other sequence numbers in the subnet, or it may comprise detecting a sequence number that has been propagated with greater delay than an expected delay. If a REED to router transition would exceed a router number limit, the method may include forcing a router having least negative effect on the network, subnet or partition to downgrade to a REED state.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product tangibly embodied in a non-transient computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method for operating a device in a network, comprising:
   entering said device into a non-router membership relation with a self-organizing subnet of said network;
   receiving at least one message making known parameters of said subnet, said at least one message comprising a centrally-generated and propagated sequence number, said sequence number generated by a leader of said subnet as part of a series increasing in value over time;
   detecting, based on the received at least one message comprising a sequence number, a deterioration in propagation of said at least one message, the deterioration comprising one of:
   some routers propagating older sequence numbers than other routers, and
   some routers sending delayed messages; and
   responsive to said detecting, entering said device into a router membership relation with said self-organizing subnet of said network.

2. The machine-implemented method of claim 1, said network comprising a Thread network.

3. The machine-implemented method of claim 2, said self-organizing subnet comprising a Thread network partition.

4. The machine-implemented method of claim 1, said at least one message comprising an advertisement message.

5. The machine-implemented method of claim 1, said entering said device into a non-router membership relation comprising entering said device into a router-eligible end device (REED) relation.

6. The machine-implemented method of claim 1, said entering said device into a router membership relation enabling said device to further propagate said centrally-generated and propagated sequence number.

7. The machine-implemented method of claim 1, said detecting when at least one of said sequence numbers indicates a deterioration in propagation of said at least one message comprising detecting a sequence number propagated by a router remaining static over time.

8. The machine-implemented method of claim 1, said detecting when at least one of said sequence numbers indicates a deterioration in propagation of said at least one message comprising detecting a sequence number propagated by a router diverging from other sequence numbers in the subnet.

9. The machine-implemented method of claim 1, said detecting when at least one of said sequence numbers indicates a deterioration in propagation of said at least one message comprising detecting a sequence number propagated with greater delay than an expected delay.

10. The machine-implemented method of claim 5, responsive to detecting that a REED to router transition would exceed a router number limit, forcing a router having least negative effect on the subnet to downgrade to a REED state.

11. An electronic device comprising circuitry configured to:
    enter said device into a non-router membership relation with a self-organizing subnet of said network;
    receive at least one message making known parameters of said subnet, said at least one message comprising a centrally-generated and propagated sequence number, said sequence number generated by a leader of said subnet as part of a series increasing in value over time;
    detect, based on the received at least one message comprising a sequence number, a deterioration in propagation of said at least one message, the deterioration comprising one of:
    some routers propagating older sequence numbers than other routers, and
    some routers sending delayed messages; and
    responsive to said detecting, enter said device into a router membership relation with said self-organizing subnet of said network.

12. A non-transient computer readable medium having computer readable program code embodied thereon, said computer readable program code being operable, when loaded into a computer and executed thereon, to cause said computer to:
    enter said device into a non-router membership relation with a self-organizing subnet of said network;
    receive at least one message making known parameters of said subnet, said at least one message comprising a centrally-generated and propagated sequence number, said sequence number generated by a leader of said subnet as part of a series increasing in value over time;
    detect, based on the received at least one message comprising a sequence number, a deterioration in propagation of said at least one message, the deterioration comprising one of:
    some routers propagating older sequence numbers than other routers, and
    some routers sending delayed messages; and
    responsive to said detecting, enter said device into a router membership relation with said self-organizing subnet of said network.

13. The non-transient computer readable medium of claim 12, said network comprising a Thread network.

14. The non-transient computer readable medium of claim 12, said self-organizing subnet comprising a Thread network partition.

15. The non-transient computer readable medium of claim 12, said at least one message comprising an advertisement message.

16. The non-transient computer readable medium of claim 12, said code for causing said computer to enter said device into a non-router membership relation comprising code for causing said computer to enter said device into a router-eligible end device (REED) relation.

17. The non-transient computer readable medium of claim 12, said code for causing said computer to enter said device into a router membership relation comprising code enabling said device to further propagate said centrally-generated and propagated sequence number.

18. The non-transient computer readable medium of claim 12, said code for causing said computer to detect when at least one of said sequence numbers indicates a deterioration in propagation of said at least one message comprising code for causing said computer to detect a sequence number propagated by a router remaining static over time.

19. The non-transient computer readable medium of claim 12, said code for causing said computer to detect when at least one of said sequence numbers indicates a deterioration in propagation of said at least one message comprising code for causing said computer to detect a sequence number propagated by a router diverging from other sequence numbers in the subnet.

20. The non-transient computer readable medium of claim 12, said code for causing said computer to detect when at least one of said sequence numbers indicates a deterioration in propagation of said at least one message comprising code for causing said computer to detect a sequence number propagated with greater delay than an expected delay.

* * * * *